United States Patent [19]

Tallman et al.

[11] Patent Number: 4,860,725
[45] Date of Patent: Aug. 29, 1989

[54] POWER BURNER-FLUID CONDENSING MODE FURNACE

[75] Inventors: William R. Tallman, Huntington; Steven C. McDevitt, Fort Wayne, both of Ind.; Warren H. Delancey, Elyria, Ohio

[73] Assignee: Yukon Energy Corporation, Minneapolis, Minn.

[21] Appl. No.: 346,365

[22] Filed: Apr. 27, 1989

Related U.S. Application Data

[63] Continuation of Ser. No. 526,107, Aug. 24, 1983, abandoned.

[51] Int. Cl.$^4$ ............................................. F24H 3/02
[52] U.S. Cl. ............................ 126/110 R; 126/116 A; 126/116 R; 126/118
[58] Field of Search ........... 126/110 R, 116 R, 110 A, 126/110 B, 116 A, 116 B, 106, 99 R, 109, 118; 432/222; 431/31

[56] References Cited

U.S. PATENT DOCUMENTS

| | | |
|---|---|---|
| 1,546,592 | 7/1925 | Lawrence . |
| 1,621,881 | 3/1927 | Harrison . |
| 1,972,549 | 8/1934 | Caneron ........................ 126/116 R |
| 2,013,237 | 9/1935 | Funk ................................ 126/116 |
| 2,022,835 | 12/1935 | Whiteley ........................ 126/116 R |
| 2,247,849 | 7/1941 | Ritter ................................ 126/116 |
| 2,258,790 | 10/1941 | Murphy .......................... 126/116 R |
| 2,451,851 | 10/1948 | McCollum ...................... 126/116 R |
| 2,504,315 | 4/1950 | Feuerfile ......................... 126/110 |
| 2,556,170 | 6/1951 | Davidson ........................ 126/116 R |
| 2,592,396 | 4/1952 | Dahlstrom ....................... 126/110 |
| 2,599,101 | 6/1952 | Ferer ................................ 126/116 A |
| 2,603,208 | 7/1952 | Beauchamp ..................... 126/116 |
| 2,715,399 | 8/1955 | Witt et al. ........................ 126/110 |
| 2,751,900 | 6/1956 | Modine ............................ 126/110 |
| 2,811,151 | 10/1957 | Ezdebski ......................... 126/116 R |
| 2,916,032 | 12/1959 | Kitchen ........................... 126/116 |
| 3,294,082 | 12/1966 | Norris .............................. 126/116 |
| 3,358,672 | 12/1967 | Dirk et al. ....................... 126/110 |
| 3,481,321 | 12/1969 | Reichelderler .................. 126/116 R |
| 3,504,661 | 4/1970 | Morris et al. ................... 126/116 |
| 3,661,140 | 5/1972 | Raleigh ........................... 126/110 |
| 3,667,451 | 6/1972 | Boucher .......................... 126/110 |
| 3,670,713 | 6/1972 | Abbott ............................. 126/110 |
| 3,726,267 | 4/1973 | Cavestany et al. ............. 126/85 |
| 3,807,382 | 4/1974 | Kennedy ......................... 126/116 |
| 3,926,173 | 12/1975 | Jury ................................. 126/110 |
| 3,944,136 | 3/1976 | Huie ................................ 126/110 |
| 4,006,728 | 2/1977 | Nishi et al. ..................... 126/110 |
| 4,106,474 | 8/1978 | Hunter et al. ................... 126/10 |
| 4,119,080 | 10/1978 | Smith .............................. 126/116 R |
| 4,160,440 | 7/1979 | Barnickle ........................ 126/110 |
| 4,164,210 | 8/1979 | Hollowell ........................ 126/110 |
| 4,175,518 | 11/1979 | Reames, Jr. ..................... 122/20 |
| 4,271,789 | 6/1981 | Black ............................... 122/16 |
| 4,275,705 | 6/1981 | Schaus et al. ................... 126/110 |
| 4,289,730 | 9/1981 | Tomlinson ...................... 422/178 |
| 4,299,555 | 11/1981 | Kamberg ......................... 437/31 |
| 4,336,791 | 6/1982 | Kitchhen ......................... 126/110 R |
| 4,537,178 | 8/1985 | Hwang et al. .................. 126/110 R |
| 4,557,249 | 12/1985 | Sweedyk ........................ 126/110 R |
| 4,558,689 | 12/1985 | McCann ......................... 126/110 R |
| 4,561,421 | 12/1985 | Hwang et al. .................. 126/110 R |

Primary Examiner—James C. Yeung
Attorney, Agent, or Firm—Warren A. Sturm

[57] ABSTRACT

A condensing mode furnace fired by a gun-type, power fluid fuel burner, such as an oil or gas burner, as a heat exchanger with a combustion chamber therein and communicating therewith. A duct carries the products of combustion from the heat exchanger to a thin and tube type condenser. An exhaust vent carries the products of combustion and condensate from the condenser, a drain line removing the condensate from the exhaust vent. A blower in the exhaust vent causes a flow of the products of combustion from the heat exchanger through the condenser and exhaust vent. An air passage surrounds the heat exchanger and condenser and a blower causes a flow of air serially over the condenser and heat exchanger to a hot air outlet. The furnace control initiates operation of the vent blower in response to a thermostat calling for heat in advance of operation of the burner thereby to purge on burned gases from the combustion chamber and heat exchanger. The vent blower remains in operation while the burner is in operation provide a draft for the burner so that the burner does not operate against a back pressure. The vent blower remains in operation under the control of the fan and limit switch after the thermostat has shut-down the burner in order again to purge unburned gases from the combustion chamber.

9 Claims, 6 Drawing Sheets

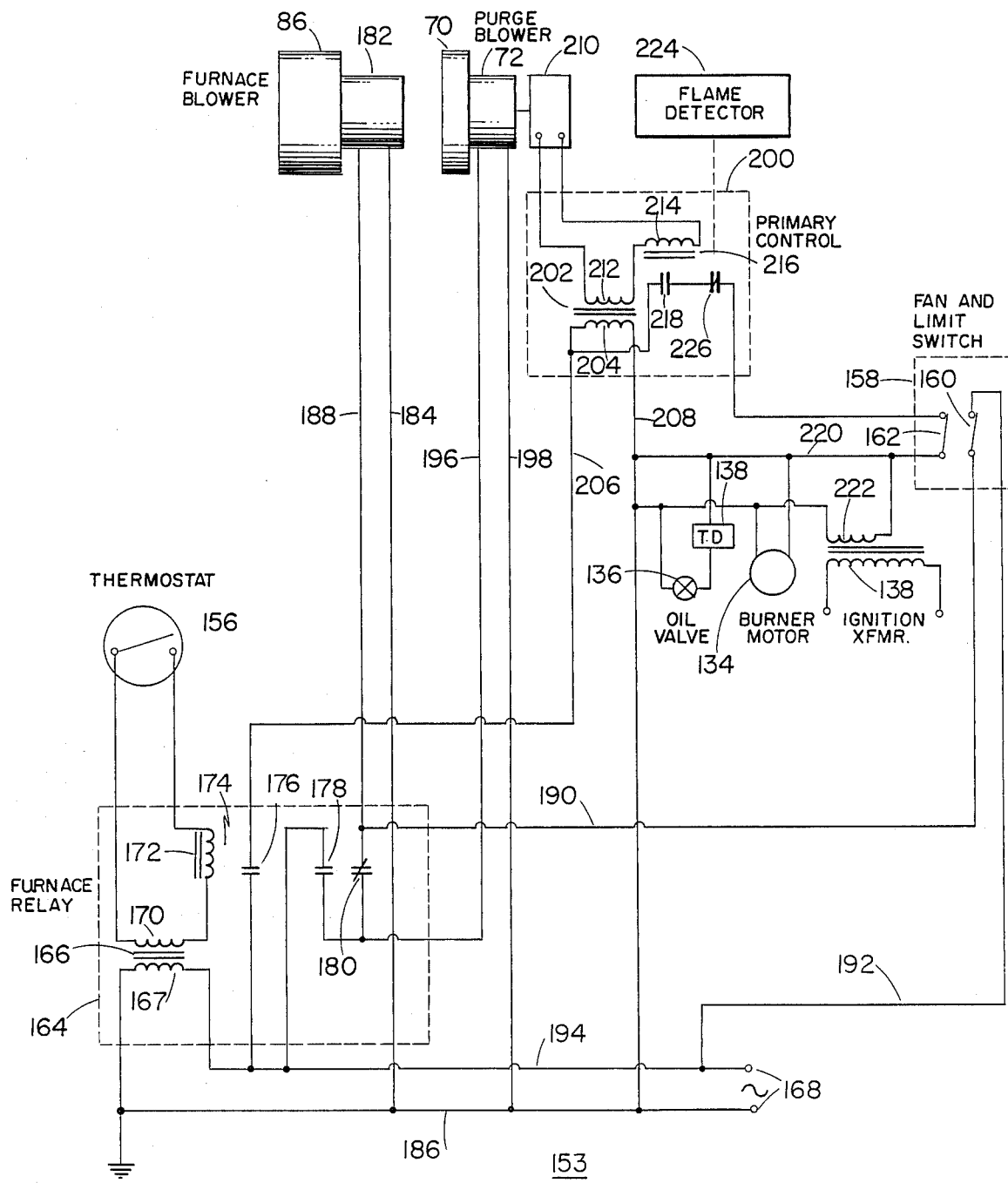

4,860,725

POWER BURNER-FLUID CONDENSING MODE FURNACE

This is a continuation of co-pending application Ser. No. 526,107 filed on Aug. 24, 1983 abandoned.

BACKGROUND OF THE INVENTION

1. Field of the Invention

This invention relates generally to gun-type, power fluid fuel burner-fired hot air furnaces, and more particularly to a condensing mode furnace of that type.

2. Description of the Prior Art

Gun-type, power fluid fuel burner-fired hot air furnaces conventionally comprise a gun-type power burner, such as an oil or gas burner; a heat exchanger for extracting heat from the products of combustion of the burner and having a combustion chamber therein which communicates with the heat exchanger and into which the burner fires; an exhaust passage for carrying the products of combustion from the heat exchanger to an exhaust flue, an air passage for carrying a flow of air over the heat exchanger to a hot air outlet thereby to extract heat from the heat exchanger; and a blower for causing a flow of air through the air passage.

Condensing mode furnaces are known which include a condenser for condensing water out of the products of combustion to reduce the stack temperature and thereby increase the efficiency of the furnace.

Conventional gun-type, power fluid fuel burner-type furnace systems typically include a thermostat for sensing the temperature in the space to be heated, and a furnace control including a fan and limit switch. Closing of the thermostat contacts initiates operation of the burner followed by initiation of operation of the blower by the fan switch. Opening of the thermostat contacts terminates operation of the burner and the fan switch thereafter terminates operation of the blower.

SUMMARY OF THE INVENTION

The invention, in its broader aspects is embodied in a hot air furnace including a gun-type power fluid fuel burner, heat exchanger means for extracting heat from the products of combustion of the burner, exhaust passage means for carrying the products of combustion from the heat exchanger means to an exhaust flue, air passage means for carrying a flow of air over the heat exchanger means thereby to remove heat therefrom, and air moving means for causing a flow of air through the air passage means. In accordance with the invention, condenser means is provided in the exhaust passage means for removing water from the products of combustion therein, the condenser means being exposed to the air passage means. Drain means is provided connected to the exhaust passage means for removing condensate therefrom, and second air moving means is provided in the exhaust passage means for causing an air flow therein from the heat exchanger means to the exhaust flue.

In the preferred embodiment of the invention, the condenser means is a fin and tube-type condenser serially coupled between the heat exchanger having a combustion chamber therein into which the burner fires, and a vent having the second air moving means in the form of a blower therein.

It is accordingly an object of the invention to provide an improved gun-type power fluid fuel burner-fired hot air furnace.

Another object of the invention is to provide an improved gun-type power fluid fuel burner-fired hot air furnace including a condenser for removing water from the products of combustion.

The above-mentioned and other features and objects of this invention and the manner of attaining them will become more apparent and the invention itself will be best understood by reference to the following description of embodiments of the invention taken in conjunction with the accompanying drawings.

BRIEF DESCRIPTION OF THE DRAWINGS

FIG. 8 is a schematic diagram showing the control system for the furnace of the invention.

BRIEF DESCRIPTION OF THE PREFERRED EMBODIMENT

Figure 1:
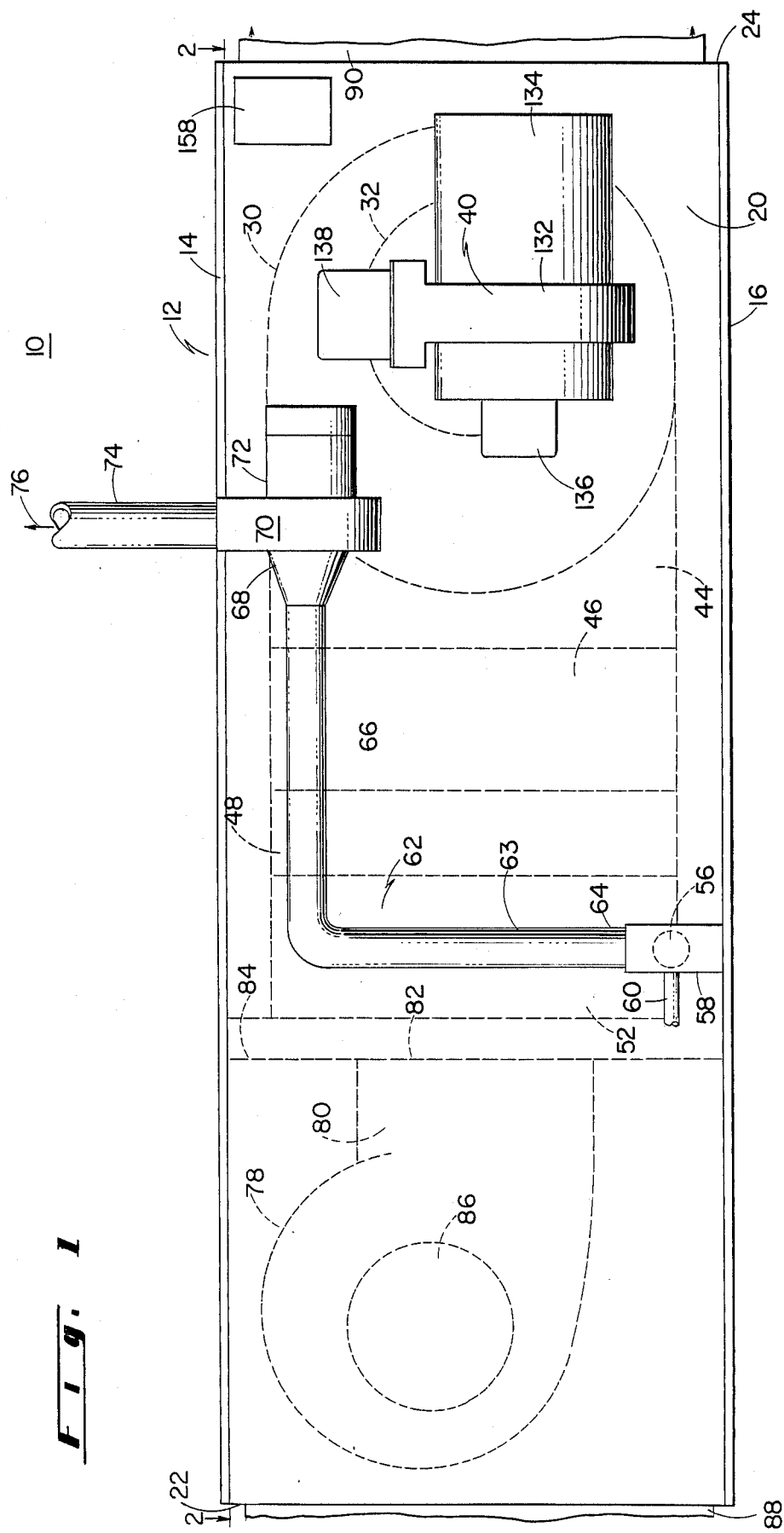
FIG. 1 is a side elevational view of the improved gun-type, power fluid fuel burner-fired, condensing mode hot air furnace of the invention.

Referring now to FIGS. 1 through 5 of the drawings, there is shown the improved gun-type, power fluid fuel burner-fired, condensing mode furnace of the invention, generally indicated at 10. Furnace 10 has enclosure or casing 12 formed by top and bottom walls 14, 16, side walls 18, 20 and end walls 22, 24. End wall 22 has cold air inlet opening 26 therein and end wall 24 has a hot air outlet opening 28 therein.

Heat exchanger 30 formed of suitable metal is supported within casing 12 by a suitable support means (not shown) adjacent but spaced from end wall 24, and spaced from top and bottom walls 14, 16 and side walls 18, 20. Combustion chamber 32, formed of suitable material, is positioned within heat exchanger 30 and has opening 34 in its side wall communicating with the interior of heat exchanger 30.

Figure 3:
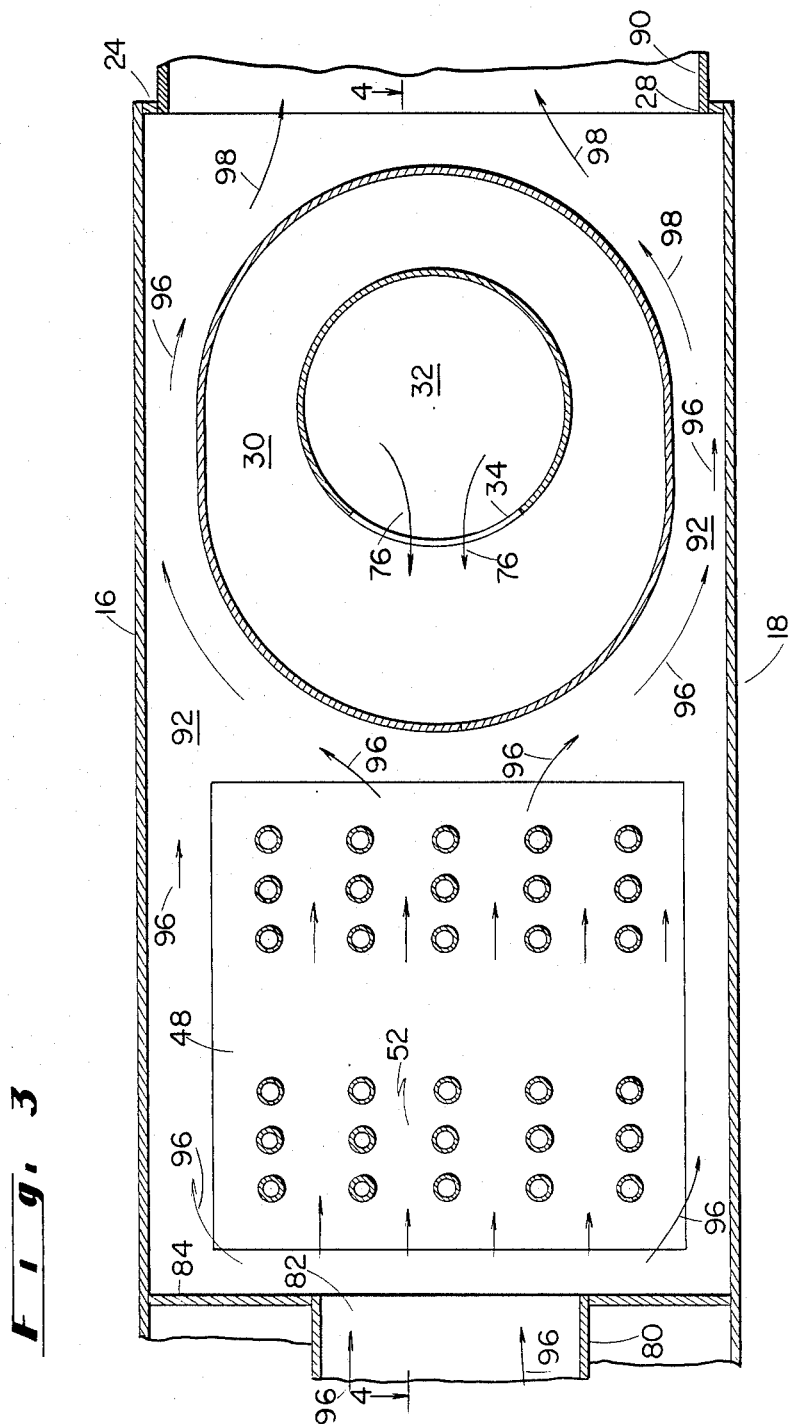
FIG. 3 is a cross-sectional view taken generally along the line 3—3 of FIG. 2.

Combustion chamber 32 has sleeve 36 extending outwardly to casing side wall 20 and terminating at flange 38. Conventional gun-type, power fluid fuel burner 40 is mounted on flange 38 in conventional fashion and has its blast tube 42 extending through sleeve 36 into the interior of combustion chamber 32 so that burner 40 fires into combustion chamber 32. Burner 40 may be either a power oil burner or a power gas burner and in a specific embodiment of the invention, burner 40 may be a model HS oil burner manufactured by the assignee of the present application. Heat exchanger 30 preferably has a generally oval cross-sectional configuration as best seen in FIGS. 1 and 3.

Duct 44 is connected to heat exchanger 30 and communicates therewith. Primary fin-and-tube condenser assembly 46 extends transversely in casing 12 between duct 44 and manifold 48, end portion 50 of duct 44 also serving as a manifold for the tubes of condenser assembly 46. Secondary fin-and-tube condenser assembly 52 extends transversely between manifold 48 and manifold 54 in spaced, parallel relationship with condenser assembly 46. Vent duct section 56 extends outwardly from manifold 54 through casing side wall 20 adjacent bottom wall 16 to sump 58. Condensate drain line 60 is connected to sump 58 as will hereinafter be more fully described.

Another vent duct 62 is provided having generally upwardly extending section 63 with its lower extremity 64 connected to sump 58, and horizontal section 66 terminating in inlet 68 of blower 70 driven by motor 72. Exhaust flue 74 is connected to the discharge of purge blower 70.

It will now be seen that duct 44, tubes 100 of condenser assembly 46, manifold 48, tubes 102 of condenser assembly 52, manifold 54, vent duct section 56, sump 58, and vent duct 62 form an exhaust passage for carrying the products of combustion from burner 40, combustion chamber 32 and heat exchanger 30 to exhaust flue 74 as shown by arrows 76 in FIGS. 1, 2, 3 and 4, the products of combustion being caused to flow through the exhaust passage by purge blower 70.

Conventional furnace blower 78 has its air discharge 80 communicating with condenser assemblies 46, 52 and heat exchanger 30 through opening 82 in partition 84 extending transversely across casing 12. Cool air enters inlet openings 86 in blower 78 through cool air inlet opening 26 in end wall 22 to which cool air inlet duct 88 may be connected. Hot air duct 90 may be connected to hot air discharge opening 28 in end wall 24 of casing 12. It will be understood that cool air inlet opening 26 need not be located in end wall 22.

It will now be seen that top and bottom walls 14, 16, and side walls 18, 20 of casing 16 form air passage 92 extending between opening 82 in partition 84 and hot air discharge opening 28 in end wall 24, air passage 92 surrounding condenser assemblies 46, 52 and heat exchanger 30. Thus, cold air drawn into blower 78 through cold air inlet opening 26 and cold air duct 88, as shown by arrows 94, is caused to flow over condenser assemblies 46, 52 and heat exchanger 30 to extract heat therefrom, as shown by arrows 96, and finally the thus-heated air is caused to flow through hot air discharge opening 28 and duct 90, as shown by arrows 98.

Figure 2:
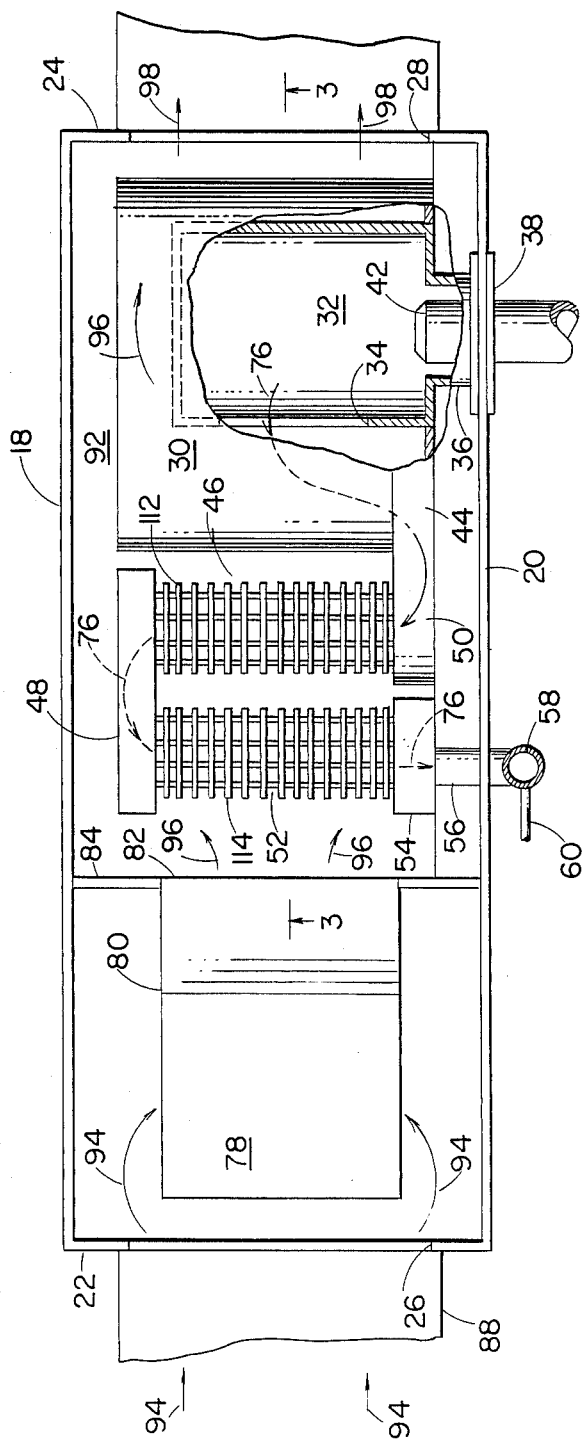
FIG. 2 is a top view, partly in cross-section and partly broken away, showing the furnace of FIG. 1 with the top panel of the furnace enclosure removed.
Figure 4:
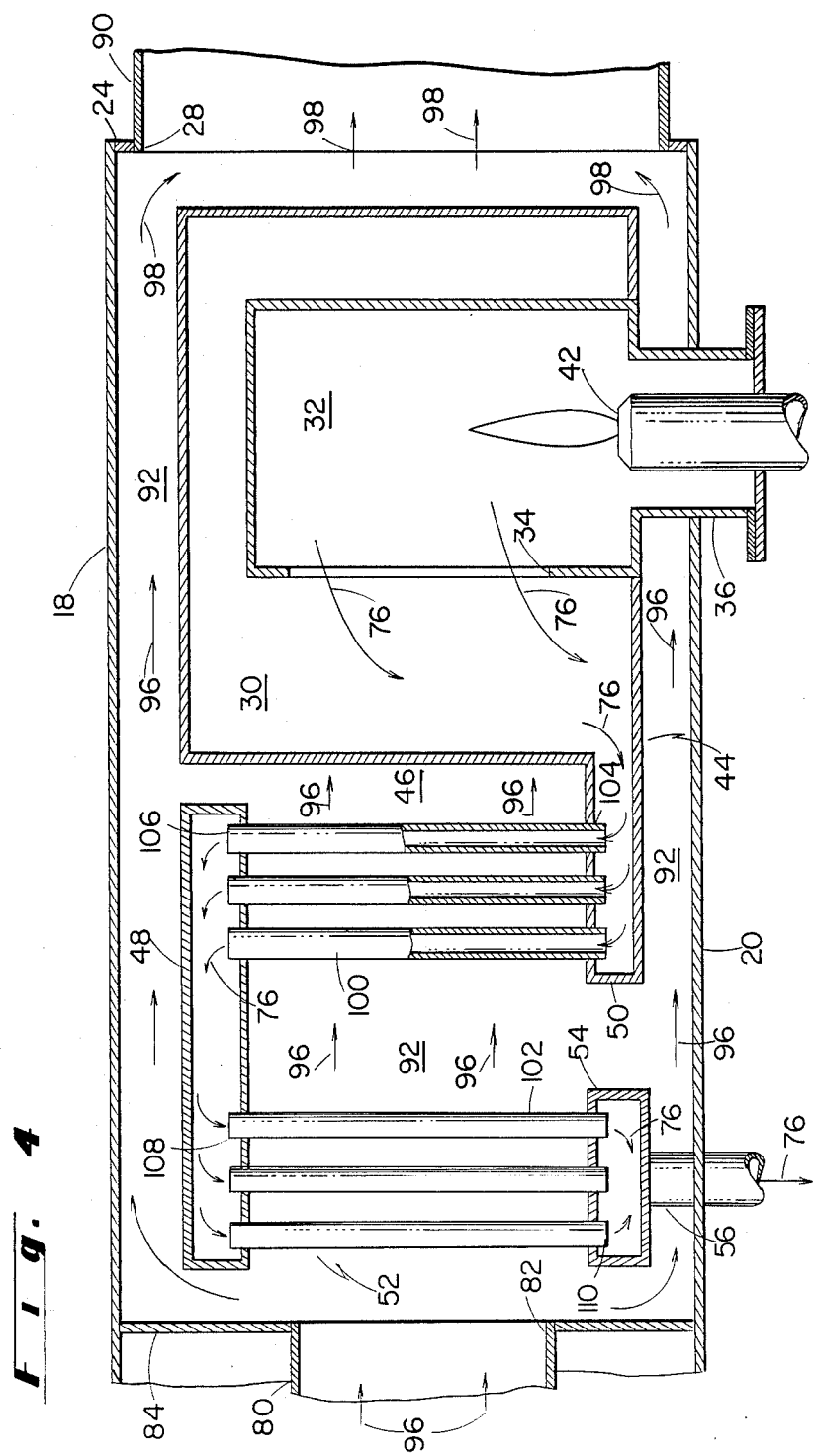
FIG. 4 is a cross-sectional view taken generally along the line 4—4 of FIG. 3.

Referring now particularly to FIGS. 3 and 4, condenser assemblies 46, 52 respectively comprise a plurality of thin-walled tubes or conduits 100, 102 each having opposite open ends 104, 106 and 108, 110, respectively. Tubes 100 of condenser assembly 46 extend transversely between manifold portion 50 of duct 44 and manifold 48 with their open ends 104, 106 respectively communicating therewith, tubes 100 being in spaced, parallel relation. Tubes 102 of condenser assembly 52 extend transversely between manifold 48 and manifold 54 with their open ends 108, 110 respectively communicating therewith, tubes 102 being in spaced, parallel relationship. Thus, the products of combustion flow serially from duct 44 through parallel tubes 100 comprising condenser assembly 46, through manifold 48, through the parallel tubes 102 to manifold 54 and vent duct 56, as shown by arrows 76 in FIG. 4. Tubes 100, 102 of condenser assemblies 46, 52 extend through thin-walled fins 112, 114 in conventional fashion (FIG. 2). In a specific embodiment of the invention, condenser assemblies 46, 52 respectively comprise fifteen stainless steel tubes each one inch in diameter and twelve inches long with eight to ten aluminum fins 112, 114 per inch.

It will be seen that the cool air from blower 78 flowing over and around condenser assemblies 46, 52, as shown by arrows 96, condenses the water from the products of combustion, the resulting condensate flowing through vent duct 56 into sump 58.

Figure 5:
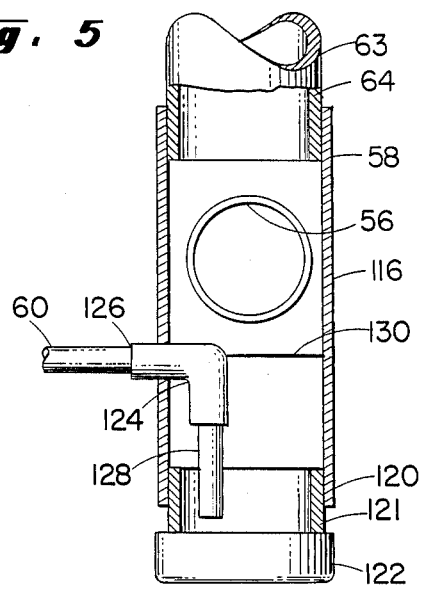
FIG. 5 is a fragmentary cross-sectional view showing the connection of the condensate drain line to the exhaust vent of the furnace of the invention.

Referring now to FIG. 5, sump 58 comprises sleeve 116 with its upper end 118 having a slip-fit with the lower extremity 64 of vent duct section 63. Vent duct section 56 is connected to sleeve 116 lower end 120 of sleeve 116 has a slip-fit with sleeve 121 closed by cap 122. Because of the low stack temperatures provided by the improved furnace of the invention, which may be less than 100° F., sleeves 116, 121, cap 122, vent duct 62, and exhaust flue 74 may be formed of PVC.

Drain line 60 has elbow 124 connected to its end 126 and extending through the wall of sleeve 116. Drain line 60 is preferably is located below exhaust duct 56, as shown in FIG. 5. Short extension 128 of drain line 60 is connected to elbow 124 and extends downwardly into sleeve 121. It will be seen that when condensate drained from condenser assemblies 46, 52 through exhaust duct 56 rises in sump 58 to the level shown by dashed line 130, the condensate will be drained-away by drain line 60.

Burner 40 includes conventional blower 132 driven by motor 134, conventional oil pump and valve assembly 136, and conventional ignition transformer 138. Blower 132 provides combustion and secondary air flow in blast tube 42, and provides a higher pressure than that provided by purge blower 70 in the exhaust passage. Thus, when operation of burner 40 is initiated, as will hereinafter be more fully described, the pressure in the exhaust passage including vent duct 56, as described above, provided by blower 132 causes the condensate level in sump 58 to drop and forces any condensate in which drain line extension 128 is submerged outwardly through extension 128, elbow 124 and drain line 60. After start of operation of burner 40 and blower 132, the pressure is equalized and thus, the pressure in the exhaust passage and exhaust duct 56 returns to the lower level provided by blower 70 and the condensate level rises again in sump 58, any condensate rising above level 130 being drained through drain line 60.

Figure 6:
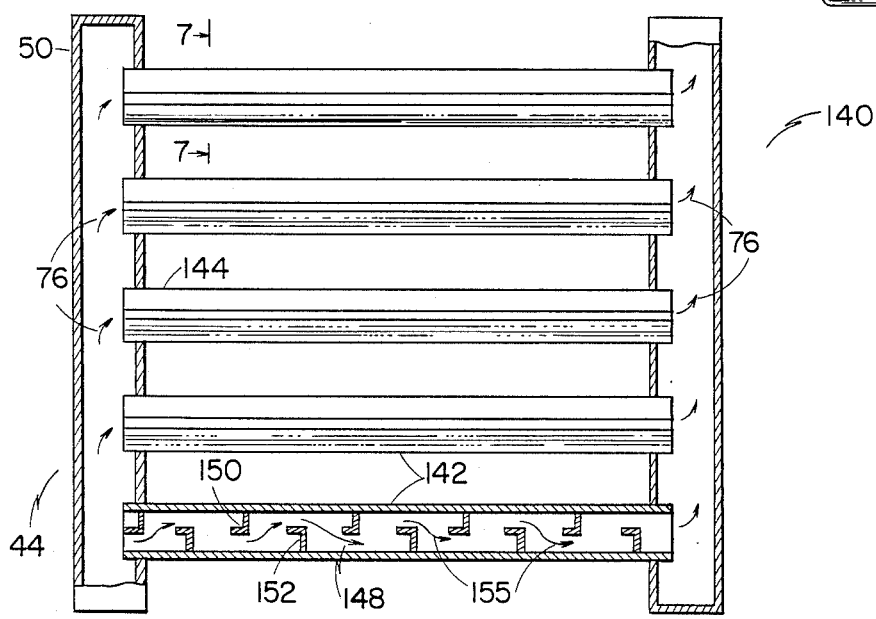
FIG. 6 is a fragmentary cross-sectional view illustrating a modification of the invention.
Figure 7:
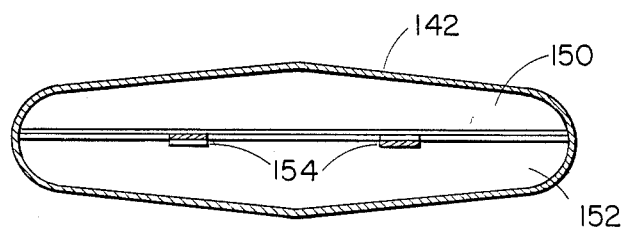
FIG. 7 is a cross-sectional view taken generally along the line 7—7 of FIG. 6.

Referring now to FIGS. 6 and 7, primary condenser assembly 46 (FIG. 2) may be replaced by secondary heat exchanger 140 so that all of the condensing function is performed by secondary condenser assembly 52. Secondary heat exchanger 140 comprises a plurality of conduits or tubes 142 respectively having open ends 144, 146 which respectively communicate with manifold end portion 50 of duct 44 and manifold 48, as shown. In a specific embodiment, five tubes 142 were provided formed of thin-wall aluminized steel each twelve inches long and five inches by two inches in cross-section.

Each tube 142 of secondary heat exchanger 140 has baffle assembly 148 therein. Each baffle assembly 148 comprises a plurality of oppositely extending baffle elements 150, 152 secured to elongated support members 154. Baffle elements 150, 152 cause the products of combustion to flow in an undulating or serpentine path through tubes 142, as shown by arrows 155, thereby to wipe the interior surfaces of tubes 142 for more efficient heat transfer. In a specific embodiment, about ten baffles 150, 152 were positioned in each tube 142.

Referring now to FIG. 8, there is shown control system 153 for furnace 10. Control system 153 is adapted to be connected to conventional thermostat 156 for sensing the temperature in the space to be heated. Furnace 10 includes conventional fan and limit switch 158 having thermostatically actuated fan switch 160 and thermostatically actuated limit switch 162. Fan switch 160 has its contacts closed in response to the temperature of the heated air in air passage 92 adjacent hot air discharge opening 28 rising to a predetermined level, and its contacts opened when that temperature falls below the predetermined level. Limit switch 162 has its contacts opened when the temperature in air passage 92 adjacent hot air discharge opening 24 rises above a predetermined higher level.

Control system 153 comprises conventional furnace relay 164 including step-down transformer 166 having its primary winding 167 coupled across line voltage terminals 168 for reducing the line voltage, typically 120 volts, 60 Hertz, to a lower control voltage across its secondary winding 170, typically 24 volts.

The contacts of thermostat 156 couple secondary winding 170 of transformer 166 across operating coil 172 of relay 174 for energization thereby. Relay 174 has normally open contacts 176, 178 and normally closed contacts 180. In a specific embodiment of the invention, furnace relay 164 is a Honeywell R8239A relay. Furnace blower 86 is operated by motor 182 connected by lead 184 to grounded side 186 of line voltage source 168 and connected by lead 188, lead 190, fan switch 160 and lead 192 to "hot" side 194 of line voltage source 168.

Purge blower motor 72 is coupled by lead 196 and normally open contacts 178 of relay 174 to side 194 of line voltage source 168, and is coupled by lead 198 to grounded side 186. Purge motor blower lead 196 is also coupled to side 194 of line voltage surface 168 by normally closed contacts 180 of relay 174, lead 190, limit switch 162 and lead 192.

Primary burner control 200 comprises step-down transformer 202 having its primary winding coil 204 coupled across line voltage source 168 by normally open contacts 176 of relay 174, and by lead 208. Purge blower motor 72 has centrifugal switch contacts 210 coupling secondary winding 212 of transformer 202 across operating coil 214 of primary control relay 216. Normally open contacts 218 of primary control relay 216 couple lead 206, which is coupled to side 194 of line voltage source 168 by normally open contact 176 of relay 174, through limit switch 162 to lead 220. Lead 220 is connected to one side of primary winding 222 of ignition transformer 138, one side of burner motor 134, and one side of oil valve 136 through conventional time delay 139. The other sides of primary winding 222 of ignition transformer 138, burner motor 134 and oil valve 136 are coupled to the grounded side 186 of line voltage source 168 by lead 208. Conventional flame detector 224, after a predetermined number of unsuccessful attempts to detect flame from burner 40 in combustion chamber 32, latches-out normally closed contacts 226 in series with contacts 218 of primary control relay 216. The voltage across secondary winding 212 of transformer 202 typically is 24 volts. In a specific embodiment, primary control 200 is Honeywell R8184K1006.

In operation, when the contacts of thermostat 156 close thus calling for heat, operating coil 172 of furnace relay 174 is energized thus closing contacts 176, 178. Closing of furnace relay contacts 178 energizes purge blower motor 72 thereby to initiate operation of purge blower 70 to prepurge any unburned gases in combustion chamber 32 and heat exchanger 30. When purge blower motor 72 reaches the predetermined speed, centrifugal switch contacts 210 are closed thus energizing operating coil 214 of primary control relay 216 closing its contacts 218. Limit switch 162 is normally closed and thus, closure of relay contacts 218 energizes burner motor 134, ignition transformer 138, and oil valve 136 after a short time delay provided by time delay 139, all in conventional fashion. Assuming that satisfactory ignition of the burner has been obtained and thus that flame detector 224 has not latch-opened its contacts 226, when a predetermined temperature is reached in air passage 92 adjacent hot air discharge opening 24, fan switch 160 closes thus energizing furnace blower motor 182 by lines 188, 190, 192, 194, and 184, 186. It will be observed that purge blower motor 72 remains energized to operate purge blower 70 during operation of burner 40 through contacts 178 of furnace relay 174 which is energized while the contacts of thermostat 156 are closed.

When thermostat 156 is satisfied thus opening its contacts, operating coil 172 of furnace relay 174 is deenergized thus opening its contacts 176, 178 and closing its contacts 180. Opening of furnace relay contacts 176 deenergizes primary winding 204 of primary control transformer 202 thus deenergizing operating coil 214 of primary control relay 216 opening its contacts 218 and deenergizing ignition transformer 138, burner motor 134 and oil valve 136.

Upon opening of the contacts of thermostat 156 when the temperature is satisfied, contacts 180 of furnace relay 174 close and thus purge blower motor 72 remains energized through lead 192, fan switch 160, lead 190 and leads 196, 198 thereby to provide post-purge of any unburned gases remaining in combustion chamber 32 and heat exchanger 30. When the temperature in air passage 92 adjacent hot air discharge opening 24 falls to the predetermined level, fan switch contacts 160 open thereby deenergizing purge blower motor 72 and furnace blower motor 182. Limit switch contacts 162 of fan and limit switch 158 open at a predetermined high temperature to protect against excessive temperature in air passage 92 adjacent hot air discharge opening 24.

While a conventional gun-type power oil burner has been described in connection with FIG. 8 of the drawings, such as model HS manufactured by the assignee of the present application, a conventional gun-type pressure gas burner, such as model HSG also manufactured by the assignee of the present application, may be substituted therefor. It will readily be understood that a solid state control may be employed in place of the relay-type control system shown in FIG. 8 and described above.

It will now be seen that the invention provides an improved, highly efficient gun-type pressure fluid fuel burner-fired condensing mode hot air furnace which, by reason of the very low stack temperatures provided, permits use of a small, low temperature flue and thus elimination of the usual, costly high temperature flue pipes and chimneys with the attended risk of fire.

While there have been described above the principles of this invention in connection with specific apparatus, it is to be clearly understood that this description is made only by way of example and not as a limitation to the scope of the invention.

What is claimed is:

1. In a hot air furnace including a gun-type power fluid fuel burner, heat exchanger means for extracting heat from the products of combustion of the burner, exhaust passage means for carrying the products of combustion from the heat exchanger means to an exhaust flue, air passage means for receiving a flow of cool air over the heat exchanger means thereby to remove heat therefrom and to supply heated air to a space to be heated, and air moving means for causing a flow of air through the air passage means, the improvement comprising; condenser means serially disposed in said exhaust passage means for removing water from the products of combustion therein, said condenser means being disposed to be exposed to cool air entering said air passage means; drain means connected to said exhaust passage means for receiving condensate therefrom; second air moving means in said exhaust passage means for causing fluid flow therein from said heat exchanger means to said exhaust flue and wherein said first-named air moving means comprises a first motor-driven blower, said second air moving means comprises a second motor-driven blower, and said burner includes a blower; and said burner blower providing higher pressure than said second blower.

2. The furnace of claim 1 further comprising means for controlling said first and second blower drive motors and said burner in response to the temperature in the space to the heated, and means for sensing temperature in said air passage, said control means including means for initiating operation of said burner following initiation of operation of said second blower and for terminating operation of said burner thereby to purge fuel fumes from said heat exchanging means; said control means including means for maintaining said second blower in operation during operation of said burner whereby said burner operates against a reduced backpressure.

3. The furnace of claim 2 and means for initiating operation of said burner means in response to operation of said second air moving means.

4. The furnace of claim 3 wherein said second air moving means comprises a motor-driven blower, said initiating means comprising a centrifugal switch operated in response to a predetermined speed of said blower, and means for initiating operation of said burner means in response to said centrifugal switch.

5. In a hot air furnace including a gun-type power fluid fuel burner, heat exchanger means for extracting heat from the products of combustion of the burner, exhaust passage means for carrying the products of combustion from the heat exchanger means to an exhaust flue, air passage means, having a cool air inlet and a hot air outlet, for carrying a flow of air over the heat exchanger means thereby to remove heat therefrom, and air moving means for causing a flow of air through the air passage means, the improvement comprising; condenser means including conduit means in said exhaust passage means for removing water from the products of combustion therein, said condenser means being disposed adjacent the cool air inlet of said air passage means; drain means connected to said exhaust passage for removing condensate therefrom; second air moving means in said exhaust passage means for causing fluid flow therein from said heat exchanger means to said exhaust flue, said condenser means comprising first and second pluralities of spaced parallel conduits, the conduits of each plurality respectively having first and second opposite open ends, a first manifold having said first ends of said conduits of said first plurality of spaced parallel conduits communicating therewith, a second manifold having said second ends of said conduits of said first plurality and said first ends of said second plurality of said conduit in communication therewith, a third manifold having said second ends of said conduits of said second plurality of said conduits communicating therewith, said first, second and third manifolds respectively being serially coupled in said exhaust passage means whereby said first and second plurality of conduits are in series therein, the respective conduits thereof are connected in parallel and said second plurality of conduits are disposed adjacent the cool air inlet of said air passage means.

6. The furnace of claim 5 wherein said exhaust passage means includes a duct coupling said heat exchanger means to said condensing means and a vent duct for coupling said condensing means to said exhaust flue, said vent duct having a section extending generally upwardly from a lower extremity, said condensing means being connected to said vent duct adjacent said lower extremity, said drain means also being connected to said vent duct adjacent said lower extremity, said second air moving means being in said vent duct intermediate said lower extremity and said exhaust flue, and wherein said lower vent extremity has a sump having a closed lower end connected thereto, said drain means including a drain line having an extension portion extending downwardly into said sump toward said closed lower end.

7. In a hot air furnace including a gun-type power fluid fuel burner, heat exchanger means for extracting heat from the products of combustion of the burner, exhaust passage means for carrying the products of combustion from the heat exchanger means into an exhaust flue, air passage means for carrying a flow of air over the heat exchanger means thereby to remove heat therefrom, and air moving means for causing a flow of air through the air passage means, the improvement comprising; condenser means in said exhaust passage means for removing water from the products of combustion therein, said condenser means being exposed to said air passage; draining means connected to said exhaust passage means for removing condensate therefrom; second air moving means in said exhaust passage means for causing fluid flow therein from said heat exchanger means to said exhaust flue and wherein said heat exchanger means includes a main heat exchanger section having said burner firing therein, and a secondary heat exchanger section; said exhaust passage means comprising a first duct coupling said main heat exchanger section to said secondary heat, exchanger section, a second duct coupling said secondary heat exchanger section to said condensing means, and a vent duct for coupling said condensing means to said flue, said second air moving means being in said vent, and said main and secondary heat exchanger sections and said condenser means being disposed in said air passage so that cool air flows over said condenser means to said secondary heat exchanger and over said main heat exchanger.

8. The furnace of claim 7 wherein said secondary heat exchanger section comprises a plurality of spaced, parallel conduits for said products of combustion respectively extending transversely between said first and second ducts, each of said conduits having baffle means therein for imparting an undulating flow path to said products of combustion thereby to wipe the interior surfaces of said conduits.

9. The furnace of claim 8 wherein said secondary heat exchanger means has a generally oval cross-sectional configuration in the direction of the air flow in said air passage.

* * * * *